P. M. SITTINGER.
EDUCATIONAL DEVICE.
APPLICATION FILED OCT. 22, 1919.
1,359,115.
Patented Nov. 16, 1920.
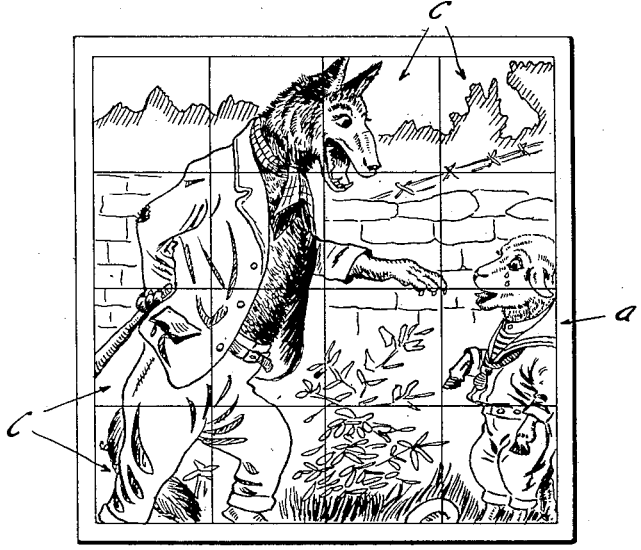
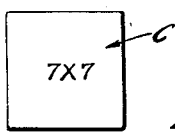
Inventor —
Paula M. Sittinger
by Knight & Cook Attys.

UNITED STATES PATENT OFFICE.

PAULA M. SITTINGER, OF ST. LOUIS, MISSOURI.

EDUCATIONAL DEVICE.

1,359,115.  Specification of Letters Patent.  Patented Nov. 16, 1920.

Application filed October 22, 1919. Serial No. 332,562.

*To all whom it may concern:*

Be it known that I, PAULA M. SITTINGER, a citizen of the United States of America, a resident of the city of St. Louis, in the State of Missouri, have invented certain new and useful Improvements in Educational Devices, of which the following is a full, clear, and exact description, reference being had to the accompanying drawings, forming a part of this specification.

My invention relates to an educational device intended for use in teaching children in arithmetic or other studies, the invention having for its object the production of a device by which problems may be presented to children and answered by them in the building up of a given design requiring the proper disposal of sections of the design upon a suitable base according to the proper answers to certain problems. With this object in view my educational device as herein shown and set forth comprises a base having thereon, preferably, the answers to problems and a plurality of sections for application to said base, said sections bearing upon their obverse sides portions of a picture or other design to be made up by collective arrangement of the sections, and bearing upon their reverse sides, preferably, problems intended to be answered by a child previous to the proper locating of the sections according to the answers on the base of my educational device.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Figure I is a top view of my educational device.

Fig. II is a top view of the base with the problem sections removed therefrom.

Fig. III is a cross section of the device.

Fig. IV is a view of the reverse side of one of the problem sections.

In the drawings A designates the base of my device preferably having a raised border $a$. This base is provided with a series of spaces $b$ on which are characters indicating the answers to or results of problems which may be of any desired description. The problems for which my educational device, as illustrated, is intended to be used involves multiplication and the spaces $b$ bear characters which are the results of certain problems in multiplication. For instance, one of the spaces contains the numeral 16 the result of $4 \times 4$, another the numeral 32 the result of $8 \times 4$ and yet another the numeral 18 the result of $2 \times 9$.

C designates problem sections which when assembled form a picture or design as seen in Fig. I, the sections including upon their obverse sides portions of a picture and having upon their reverse sides problems to be answered by a child before the sections are assembled on the base A according to their proper locations intended by the answers to the problems indicated in the space $b$ and building up of the component parts of the picture to be formed of the sections.

The reverse side of the problem section C shown in Fig. IV contains the characters $7 \times 7$ the result of which would be 49. The base A contains characters indicating this result and to properly dispose of said section it must be placed in the space occupied by the numeral 49 on said base. Another section bears on its reverse side the problem $5 \times 9$ for application to the space on the base containing the numeral 45 which is the answer to the problem. In like manner the problems on the backs of the remaining sections are to be answered and the sections properly placed according to the answers to the problems as found in the remaining spaces on the base A.

In the use of my educational device the instructor places before a child the base A of the device and gives it to one by one the problem sections C for application to said base in their proper positions. To properly apply the problem sections the child looks at the reverse side of each section and by working the problem, finds the answer, as for instance, 7 multiplied by 7 gives the result 49. The child therefore places said section having the problem $7 \times 7$ thereon in the space on the base A containing the numeral 49. On the reverse of another section the child will read $5 \times 9$ and finding that the result of this is 45, said section will be placed on the space $b$ of the base bearing the numeral 45. This procedure is followed until all of the spaces are filled with the problem sections and if the answers given by the child have been correct, the picture or other design intended to be formed will be complete and correct. However, should the picture be incorrect by the wrong placing of any problem section, indication is apparent that the child has made a mistake or mistakes in answering the problems. Such mistake may of course be detected either before or after the picture or design has been completed and the child's attention attracted to the error thereby teaching it to find the correct answer to any particular problem given.

By the use of my educational device children may be instructed in problems in an entertaining manner and without the study becoming irksome to them, their interest in the problems presented being retained through the natural desire to complete the picture, or design made up of the problem sections.

It will be understood that the problems which may be presented through the medium of my educational device are various and may involve for example addition, division, or other studies.

I claim:

1. An educational device comprising a base having a series of characters thereon, and sections for disposal over said series of characters on the base, said sections forming a design by their assemblage and having characters thereon forming a series, one series of said characters constituting problems and the other series constituting answers to said problems, the sections being adapted to be assembled on said base with the problems and answers in corresponding relations and in such relation as to build up a completed design formed of said sections.

2. An educational device comprising a base having a series of characters thereon, and sections for disposal over said series of characters on the base, said sections bearing fragments of a design serving to constitute a design by assemblage of the sections and having characters thereon forming a series, one series of said characters constituting problems and the other series constituting answers to said problems, the sections being adapted to be assembled on said base with the problems and answers in corresponding relations and in such relation as to build up a completed design formed of the fragments of design on said sections.

In testimony that I claim the foregoing I hereunto affix my signature.

PAULA M. SITTINGER.